(12) United States Patent
Priest et al.

(10) Patent No.: US 7,861,453 B2
(45) Date of Patent: Jan. 4, 2011

(54) DECOY AND DECOY STAND (75) Inventors: John Brian Priest, Dubuque, IA (US); Gregory Gustav Ladehoff, Dewitt, IA (US)

(73) Assignee: DDI, Inc, Dubuque, IA (US)

( * ) Notice: Subject to any disclaimer, the term of this patent is extended or adjusted under 35 U.S.C. 154(b) by 239 days.

(21) Appl. No.: 11/966,980

(22) Filed: Dec. 28, 2007

(65) Prior Publication Data
US 2009/0165353 A1 Jul. 2, 2009

(51) Int. Cl.
*A01M 31/06* (2006.01)
(52) U.S. Cl. .................................................. 43/2; 43/3
(58) Field of Classification Search .............. 43/2, 43/3, 21.2; 248/156, 188.7, 188.8, 507, 508, 248/530, 533, 519, 523, 525, 528, 529, 539; 446/97, 100
See application file for complete search history.

(56) References Cited
U.S. PATENT DOCUMENTS 3,734,301 A * 5/1973 Rastocny .................... 211/205
3,800,457 A * 4/1974 Barrett ............................... 43/3
3,866,872 A * 2/1975 Burgess ........................ 248/97
4,438,896 A * 3/1984 Hall ............................ 248/523
4,658,530 A   4/1987 Ladehoff
5,002,252 A * 3/1991 Setala et al. ................. 248/533
6,216,382 B1 * 4/2001 Lindaman ........................ 43/2
6,622,417 B2 * 9/2003 Liechty, II ....................... 43/3

* cited by examiner

*Primary Examiner*—Joshua J Michener
(74) *Attorney, Agent, or Firm*—Rathe Patent & IP Law

(57) ABSTRACT

A decoy has a body and a stand to support the body. In one embodiment, the stand has a least three legs which pivot between extended and collapsed positions, wherein a retainer structure releasably retains the legs in the extended positions. In another embodiment, the decoy includes an interconnect for securing the stand to the body. The interconnect snaps into connection with the body. In one embodiment, the interconnect has a pair of circumferential openings retaining the stand along the body during shipment.

21 Claims, 6 Drawing Sheets

DECOY AND DECOY STAND

BACKGROUND

Decoys comprise animal or other figurines. Decoys are sometimes used to attract animals to an area such as for hunting or other purposes. In other circumstances, decoys may be used to scare certain animals away from a selected area, such as a garden. Simulating actual movement of a real animal with a decoy may be difficult to achieve or may require multiple parts and complex assemblies, increasing manufacturing, assembly and shipping costs.

DETAILED DESCRIPTION OF THE EXAMPLE EMBODIMENTS

Figures 1, 2:
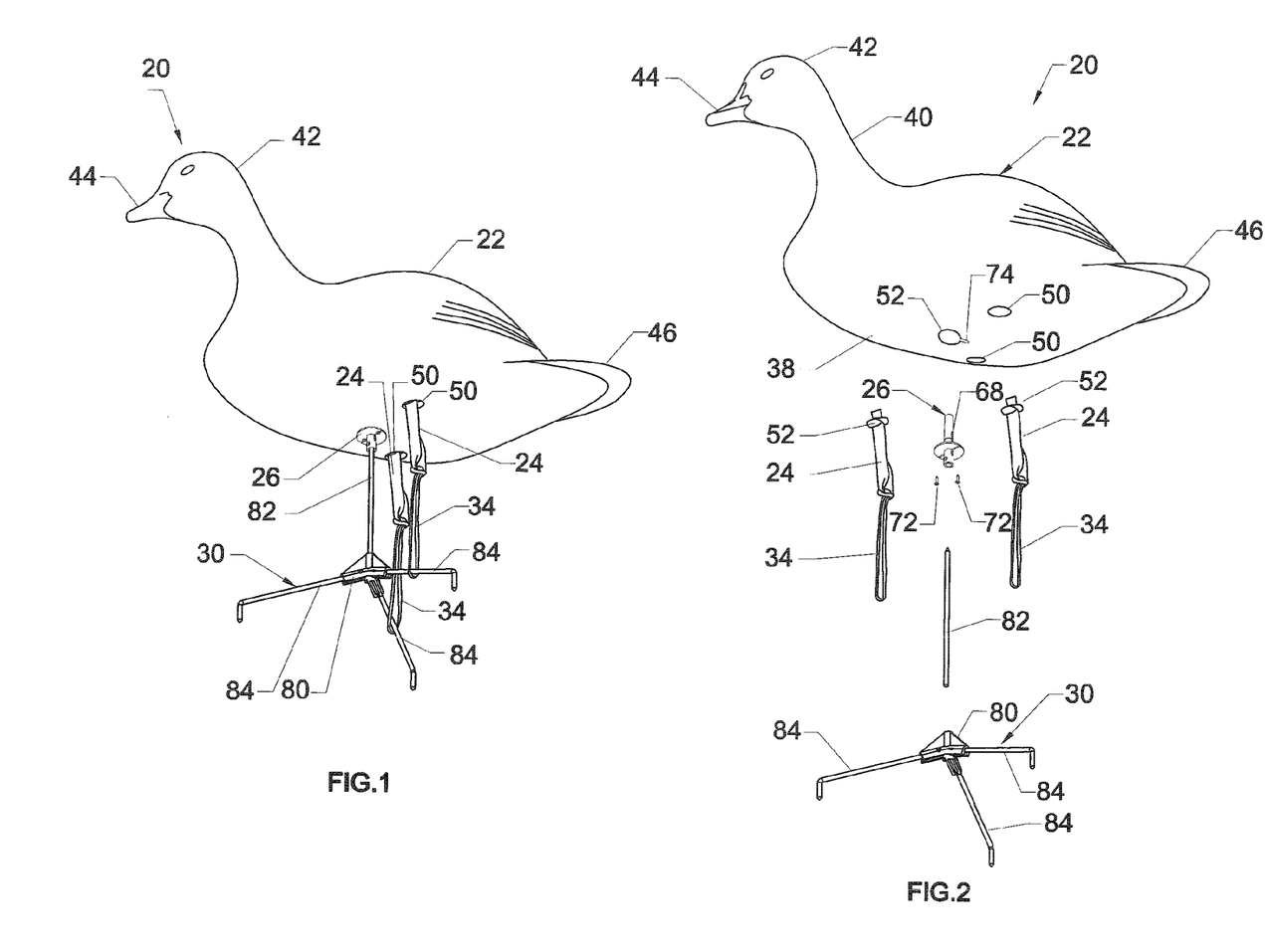
FIG. 1 is a bottom perspective to allay decoy according to an example embodiment.
FIG. 2 is an exploded perspective view of the decoy of FIG. 1 according to an example embodiment.
Figures 13, 14:
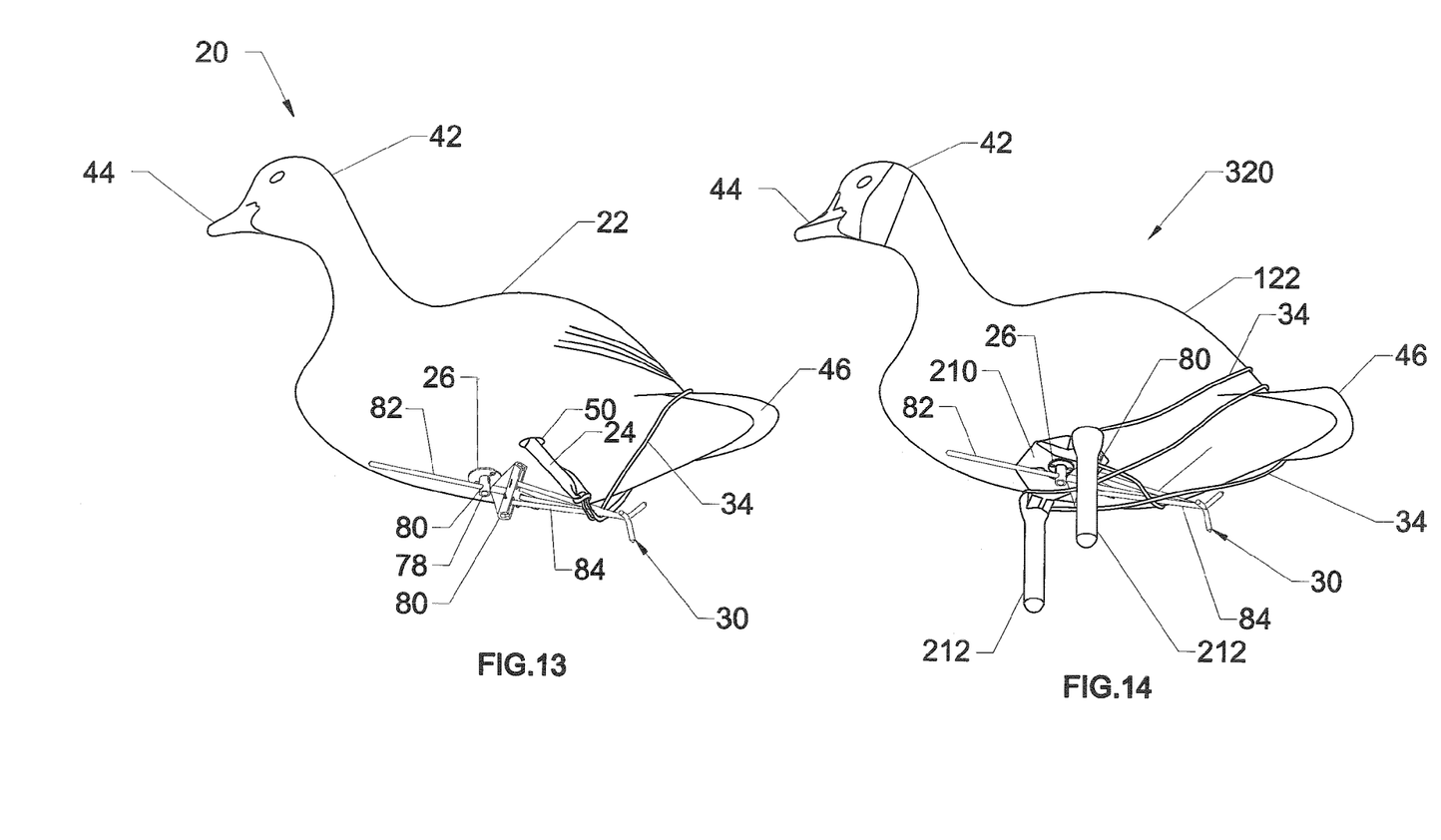
FIG. 13 is a perspective view of the decoy of FIG. 1 in a collapsed state according to an example embodiment.
FIG. 14 is a perspective view of the decoy of FIG. 11 in a collapsed eight according to an example embodiment.

FIGS. 1, 2 and 13 illustrate decoy 20 according to an example embodiment. FIG. 1 is an assembled perspective view of decoy 20. FIG. 2 is an exploded perspective view of decoy 20. FIG. 13 is a disassembled view of decoy 20 packaged for storage or shipment. As shown by such figures, decoy 20 includes body 22, legs 24, interconnect 26, stand 30, and bias members 34. Body 22 comprises a three-dimensional arrangement of one or more structures configured or shaped so as to represent or simulate the three-dimensional body of a creature or animal. In the example illustrated, body 22 is that of a bird, such as a duck or goose. As such, body 22 includes a breast portion 38, a neck 40, a head 42, a beak 44 and a tail 46. In other embodiments, body 22 may be configured so as to simulate or represent other creatures or animals. Although body 22 is illustrated as being configured so as to be three-dimensional to simulate the body of a creature in substantially all dimensions, in another embodiment, portions of body 22 may simulate or represent the creature in a two-dimensional fashion.

In the particular example illustrated, body 22 is integrally formed as part of a single unitary body. For example, in one embodiment, body 22 may be injection molded or blow molded from one or more polymeric materials. In other embodiments, body 22 may be formed from other materials and may be formed in other fashions.

As shown by FIG. 2, body 22 includes leg openings 50 and stand opening 52. In the embodiment illustrated, body 22 is essentially hollow, defined by an outer wall. Leg openings 50 and stand opening 52 comprise apertures extending through the outer wall and bounded by edges of the outer wall. In other embodiments, leg openings 50 and stand opening 52 may comprise recesses or cavities forming blind openings extending into body 22. In yet another embodiment, one or more of such openings may be omitted.

Legs 24 comprise one or more structures coupled to body 22 that are configured to simulate or represent legs of the creature or animal being represented. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

In the example illustrated, legs 24 comprise separate structures connected to body 22. In the example illustrated, legs 24 each comprise flexible straps or bands of material having a knot 52 formed at one end. Knots 52 are received within leg openings 50 and have a dimension greater than the dimensional leg openings 50 so as to be retained within body 22. During insertion, knots 52 are deformed, compressed or otherwise manipulated to pass through openings 50 until received within body 22. As a result, legs 24 are connected to and suspended from body 22. In the example illustrated, legs 24 are further connected to stand 30 by bias members 34. In another embodiment, legs 24 may alternatively be directly connected to stand 30 or may simply hang from body 22.

In one embodiment, legs 24 are further painted, colored or textured so as to correspond to the one or more colorings of actual legs of the creature being represented. Because legs 24 are flexible, legs 24 bend and move during movement of body 22 to simulate movement of legs of an actual creature or animal. In one embodiment, legs 24 are formed from bands of ribbon. Such bands of ribbon may be colored, such as with an orange color to better simulate legs of a duck or other fowl. In other embodiments, legs 24 may be formed from one or more other materials. In still other embodiments, legs 24 may alternatively be rigid or maybe integrally formed as part of a single unitary body with body 22.

Interconnect 26 comprises one or more structures configured to connect body 22 to stand 30 and to facilitate movement (rotation) a body 22 relative to stand 30. In another embodiment, interconnect 26 is configured to be inserted into stand opening 50 of body 22. In the example illustrating, interconnect 22 is configured to resiliently flex during such insertion into body 22.

Figure 3:
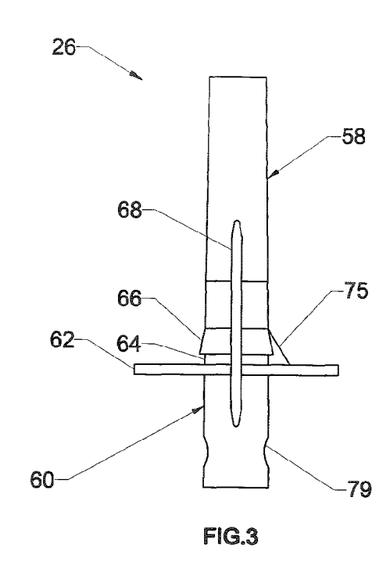
FIG. 3 is a first side elevational view of an interconnect of the decoy of FIG. 1 according to an example embodiment.
Figure 4:
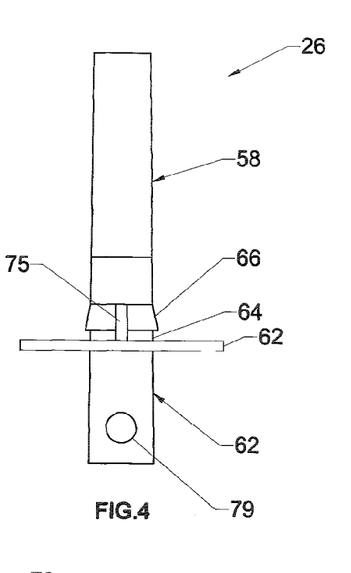
FIG. 4 is a second side elevational view of the interconnect of FIG. 3 according to an example embodiment.
Figure 5:
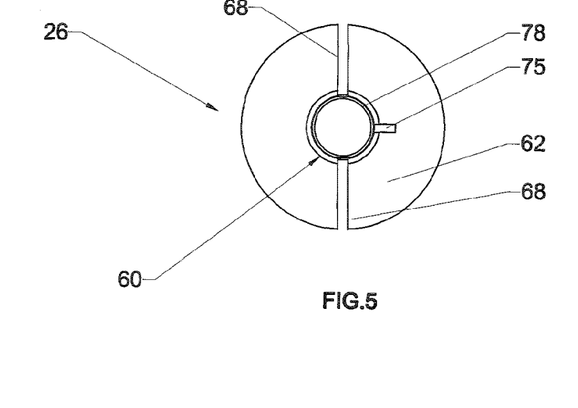
FIG. 5 is a bottom plan view of the interconnect of FIG. 3 according to an example embodiment.

FIGS. 3-5 illustrate interconnect 26 in more detail. As shown by FIGS. 3-5, interconnect 26 includes body mounting portion 58, stand mounting portion 60 and divider 62. Body mounting portion 58 mounts interconnect 26 to body 22. Body mounting portion 58 includes groove 64, taper 66 and slit 68. Groove 64 comprises notch, detent or recess configured to receive a wall of body 22 extending about opening 52 so as to secure interconnect 26 to body 22. Groove 64 has a height greater than or equal to a thickness of the walls body 22 extending about opening 52. In the example illustrated, groove 64 extends between taper 66 and divider 62, wherein taper 66 and divider 62 are larger than the opening 52 such that body 52 is captured within groove 64 for securement. In the example illustrated, groove 64 comprises an annular groove. In other embodiments, groove 64 may circumferentially about an exterior of interconnect 26 by other lesser extents.

Taper 66 and slit 68 facilitate insertion of body mounting portion 58 into opening 52 and retention of interconnect 26 to body 22 wants inserted. Taper 66 comprises surfaces that a ramp downwardly and outwardly towards groove 64. Slit 68 comprises an opening actually extending through interconnect 26 proximate to an opposite side of groove 64. Interconnect 26 is formed from one or more materials and dimensioned such that during insertion of body mounting portion 58 into opening 52, opposite circumferential sides of portion 58 are inwardly deformed, flexed or compressed towards one another to at least partially collapse slit 68 as the walls of body 22 defining opening 50 ride along taper 66. Once the walls are received within groove 64, those portions of body mounting portion 58 on opposite sides of slit 68 resiliently return towards their original shape to capture body 22 within groove 64. As a result, interconnect 26 may be quickly and easily inserted and secured to body 22 without fasteners and without the use of tools.

Figures 9, 10A, 10B:
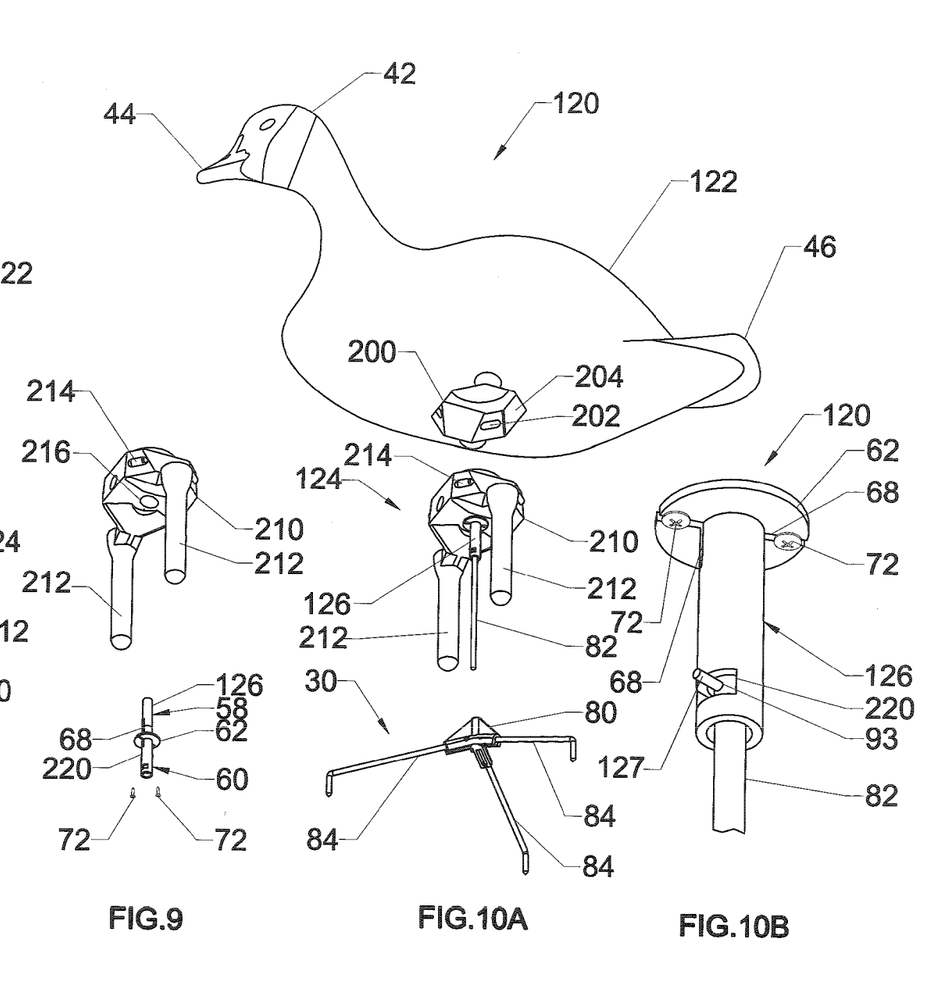
FIG. 9 is a bottom exploded perspective view of a leg mount and interconnect of the decoy of FIG. 8 according to an example embodiment.
FIG. 10A is a bottom exploded perspective view of the decoy of FIG. 8 according to an example embodiment.
FIG. 10B is a fragmentary perspective view of the decoy of FIG. 8 according to an example embodiment.

As shown by FIG. 5, slit 68 extends across divider 62. As shown by FIG. 10B, slit 68 provides an opening through which fasteners 72 may be inserted through divider 62 into screwed engagement with body 22. Fasteners 72 inhibitor relative rotation of interconnect 26 and a body 22. In other embodiments, separate holes they be provided in divider 62 to facilitate insertion of fasteners 72 through divider 62 in to engage with body 22. Instill them bobbins, other mechanisms may be used to retain interconnect 26 relative to body 22 against rotation.

As indicated in broken lines in FIGS. 2 and 3, in other embodiments, body 22 may additionally be provided with a key way 74 while interconnect 26 is provided with a key 75. In such an embodiment, key 75 extends across key way 74 when interconnect 26 is inserted through opening 52. Key 75 cooperates with key way 74 to inhibit relative rotation of body 22 and interconnect 26. Although key way 74 is illustrated as a slot while key 75 is illustrated as a bar or blade, in other embodiments, key way 74 and key 75 may have other shapes and configurations.

Stand mounting portion 60 comprises that portion of interconnect 26 configured to be connected to stand 30. Stand mounting portion 60 includes bore 78 and openings 80. Bore 78 comprises a blind hole axially extending in interconnect 26 that is configured to receive a shaft or rod of stand 30. In the example illustrated, bore 78 is dimensioned such that interconnect 26 is able to rotate relative to and about the axis of the rod of stand 30 with reduced friction such that wind of less than 20 mph may rotate body 22 and interconnect 26 about the rod of stand 30. In other embodiments, interior surfaces of interconnect 26 or exterior surfaces of the rod of stand 30 may be provided with low friction coatings, such as polytetraflouroethylene, to further facilitate such movement.

Opening 79 comprises a pair of apertures extending through opposite side walls of interconnect 26. Opening 79 is configured to facilitate insertion of the rod of stand 30 to facilitate packing and storage of stand 30 and retention of stand 30 relative to body 22 for shipment as shown in FIG. 13. In other embodiments, opening 79 may be omitted.

Divider 62 comprises a plate radially projecting outward from a remainder of interconnect 26. Divider 62 provides a surface or shoulder on one side of groove 64 to limit the extent to which interconnect 26 may be inserted into body 22 through opening 52. Divider 62 prevents over insertion of interconnect 26 into body 22. Divider 62 further provides a shoulder or surface against which fasteners 72 may bear against when retaining interconnect 26 relative to body 22. In other embodiments, divider 62 may have other configurations or may be omitted.

In the example illustrated, interconnect 26 is integrally formed as part of a single unitary body. In the example illustrated, interconnect 26 is molded from one or more polymeric materials. In other embodiments, interconnect 26 may be formed from other materials and may be formed from multiple distinct structures which are welded, bonded, fastened or otherwise joined to one another.

FIGS. 1, 2, 6, 7 and 13 illustrates stand 30. Stand 30 comprises structure by which body 22 is movably supported. As will be described hereafter, stand 30 provides a base for body 22 of decoy 20: (1) that securely and reliably supports body 22; (2) that may be easily actuated between a collapsed state or position and an extended in use state or position; (3) that has relatively few parts and is easily manufactured and assembled; and (4) that collapses to a compact state for shipping and storage. Stand 30 includes retainer 80, rod 82 and legs 84. Retainer 80 comprises one or more structures configured to interconnect legs 84 and rod 82. Retainer 80 releasably retains legs 84 in their extended positions. In the example illustrated, retainer 80 pivotably supports legs 84 for pivotal movement between their extended positions (shown in FIG. 6) and collapsed positions (shown in FIG. 13). Retainer 80 includes bore 86 and channels 88. Bore 86 comprises a blind hole configured to removably receive an end of rod 82. Bore 86 extends in an upward direction towards body 22 when legs 84 are in their extended positions. In other embodiments, bore 86 may be omitted where other structures are provided to connect rod 82 to retainer 80. In other embodiments, rod 82, itself, may be omitted where retainer 80 is directly connected to interconnect 26.

Figure 7:
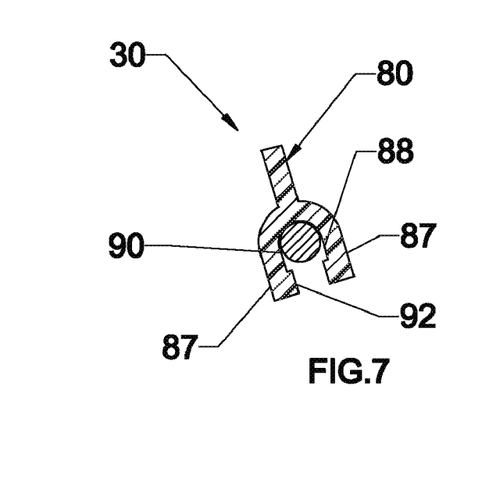
FIG. 7 is a sectional view of the stand of the FIG. 6 taken a long line 7-7 of the FIG. 6 according to an example embodiment.

Channels 88 comprises structures extending outward from bore 86 and configure to removably receive circumferential sides of legs 84. In the example illustrated, channels 84 also extend downwardly away from bore 86 such that retainer 80 is elevated by legs 84. As shown by FIG. 7, each channel 88 includes a pair of walls 87 which form a leg receiving portion 90 and a mouth 92.

Leg receiving portion 90 comprises an opening between walls 87 configured to receive a leg 84. Mouth 92 communicates with portion 90 and is sized or dimensioned less than a diameter of the leg 84 received within portion 90. As a result, leg 84 is captured and retained within portion 90 win in the extended positions shown in FIG. 6.

Walls 87 are formed from material and are dimensioned such that walls 87 are configured to resiliently flex upon receiving sufficient force to expand or enlarge mouth 92 and to permit withdrawal of leg 84 from portion 90. Walls 87 are configured to resiliently flex so as to permit withdrawal of leg 84 from portion 90 under manual force. As a result, each of legs 84 may be pivoted into and out of portion 90 between extended positions shown in FIG. 6 and collapsed positions shown FIG. 13. Mouth 92 inhibits accidental withdrawal of leg 84 from channel 88. In other embodiments, other mechanisms may be used to releasably retain the 84 in the extended position. In some embodiments, such structures, such as mouth 92, for releasably retaining leg 84 in the extended position and within portion 90 may be omitted.

Rod 82 comprises an elongate member having a first end received within bore 86 to retainer 80 and a second end configured to be received within bore 78 of interconnect 26 (shown in FIG. 5). In the example illustrated, rod 82 includes a radial opening 93. Opening 93 facilitates insertion of a pin or bar or across rod 82 for limiting rotation a body 22 about the axis of rod 82 in some embodiments as will be described hereafter. In yet other embodiments where other means are provided for limiting rotation of body 22, opening 93 may be omitted. For example, in the current embodiment, legs 24 limit the rotation of body 22 such that opening 93 may be omitted.

Figure 6:
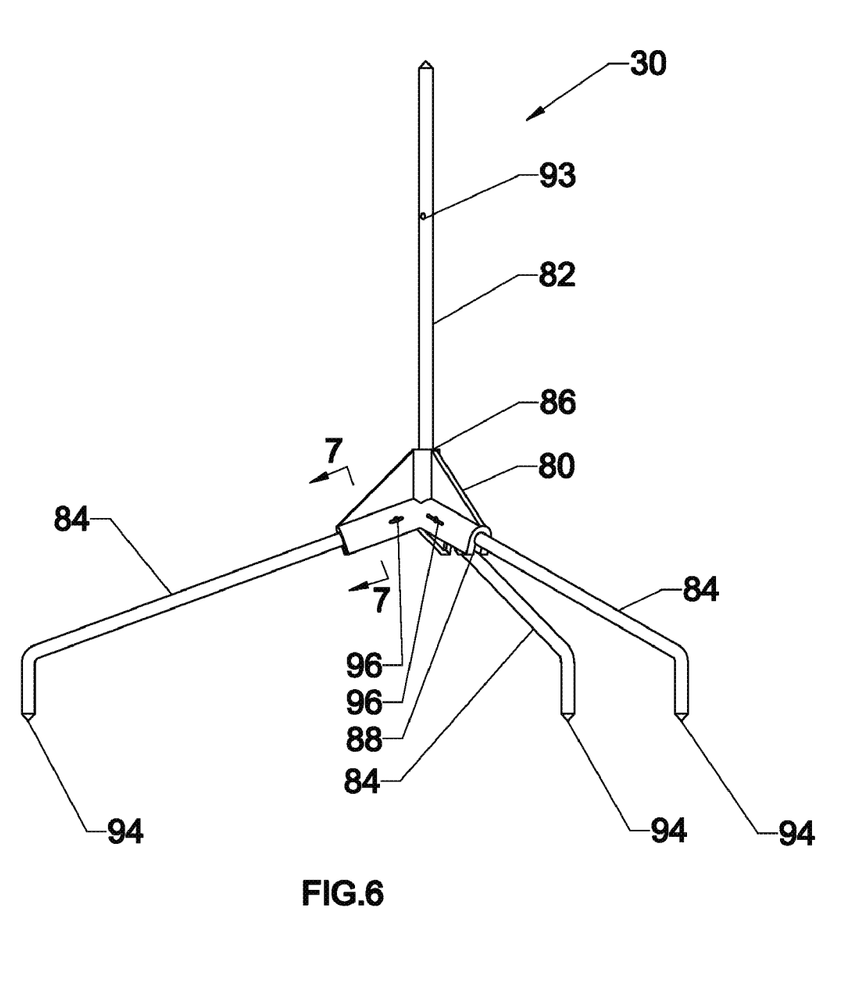
FIG. 6 is a top perspective view of a stand of the decoy of FIG. 1 according to an example embodiment.

Legs 84 provide along a members having a first end pivotally coupled to retainer 80 and a second end configured to engage a ground or other supporting structure or foundation. In the example illustrated, each of legs 84 have a pointed tip 94 configured to facilitate insertion into the ground are stably supporting stand 30. In the example illustrated, each of legs 84 is pivotably connected to retainer 80 by a cotter pin 96 extending through channel 88 and through corresponding openings in each legs 84. In other embodiments, legs 84 may be pivotally connected to retainer 80 by other fasteners or by other arrangements. Although stand 30 is illustrated as including three legs 84 which extend from retainer 80 at an angular spacing of approximately 120° apart from one another, in other embodiments, stand 30 may include a greater number of legs 84 angularly space from one other by differing extents.

Bias members 34 comprise structures extending between legs 24 and stand 30 that are configured to permit rotation a body 22 about the axis of rod 82 yet inhibit rotation a body 22 about rod 82 by 360 degrees. In the example illustrated, bias members 34 are further configured to secure and retain stand 30 against body 22 for compact storage and shipping. In the example illustrated, bias members 34 are further configured to releasably connect to stand 30, facilitating collapse of stand 30 and compact storage and shipping of decoy 20. According to one embodiment, bias members 34 comprise rubber bands having a first end secured to leg 24 and a second end configured to be wrapped about legs 84 as shown in FIG. 1. In other embodiments, bias members 34 may have other configurations or may be omitted. For example, one other embodiments, bias members 34 may be configured to be staked to the ground or other structure independent of stand 30.

FIG. 1 illustrates decoy 20 ready for use. In FIG. 1, legs 84 are pivoted to their extended positions. Rod 82 extends upward from retainer 80 and is received within interconnect 26. Legs 24 extend downward from body 22 and are connected to legs 84 stand 30 by bias members 34. Upon securement of decoy 20 in the ground, and upon encountering wind, body 22 may rotate about the axis of rod 82 to simulate movement of decoy 20. Bias members 30 for inhibit spinning of decoy 20 by 360 degrees or more about rod 82.

FIG. 13 illustrates decoy 20 in a collapsed storage state. As shown by FIG. 13, rod 82 is removed from bore 78 of interconnect 26 and is inserted through opening 79. At the same time, rod 82 remains secured to retainer 80. Legs 84 are pivoted out of channels 88 to their collapse positions in which legs 84 extend along the axis of rod 82. Legs 24 and bias members 34 are wrapped about an underside of legs 84 and secured about tail 46 of body 22 to retain legs 84 in their collapsed state in close proximity to body 22. As a result, decoy 20 is compact for shipping and storage.

FIGS. 8-10B illustrate decoy 120, another embodiment of decoy 20. Decoy 120 is similar to decoy 20 except that decoy 120 includes body 122, leg mount 124 and retainer interconnect 126 in place of body 22, legs 24 and retainer interconnect 26, respectively. As shown by FIG. 10B, decoy 120 additionally includes pin 127. Those remaining elements of decoy 120 which correspond to decoy 20 are numbered similarly.

Body 122 is similar to body 22 except that body 122 includes mounting cavity 200 in place of openings 50 and 52. Mounting cavity 200 comprises a recess formed in an underside of body 122 configured to removably receive and flex so as to resiliently retain legs 124. As shown by FIG. 10A, cavity 200 includes openings or recesses 202 configured to receive corresponding projections extending from leg mount 124. In the example illustrated, cavity 200 has a noncircular shape so as to inhibit rotation of legs 124 relative to body 122. In the example illustrated, cavity 200 is defined by resiliently flexible polymeric walls 204 which flex during insertion of leg mount 124. In other embodiments, each of walls may be more rigid, wherein leg mount 124 resiliently flex during insertion of leg mount 124 into cavity 200.

Leg mount 124 mounts to body 122 and simulates the legs of decoy 120. Leg mount 124 includes hub 210 and legs 212. Hub 210 comprises a body configured to be remotely received within cavity 200 of body 122. Hub 210 includes projections 214 and opening 216. Projections 214 comprise bulbous portions extending outwardly from a remainder of hub 210 at location so as to be received within recesses 202 within cavity 200. Projections 214 and/or walls 204 resiliently flex such that projections 214 snapped into recesses 202 resiliently retain hub 210 within cavity 200. In other embodiments, other mechanism may be used to releasably retain hub 210 within cavity 200. For example, in other embodiments, cavity 202 may include projections while hub 210 includes corresponding recesses.

Opening 216 comprise an opening extending into a hollow interior of hub 210. Opening 216 is configured to receive retainer 126. In other embodiments, where other mechanisms are used to secure or retain hub 210 within cavity 200, opening 216 may be omitted.

Figure 8:
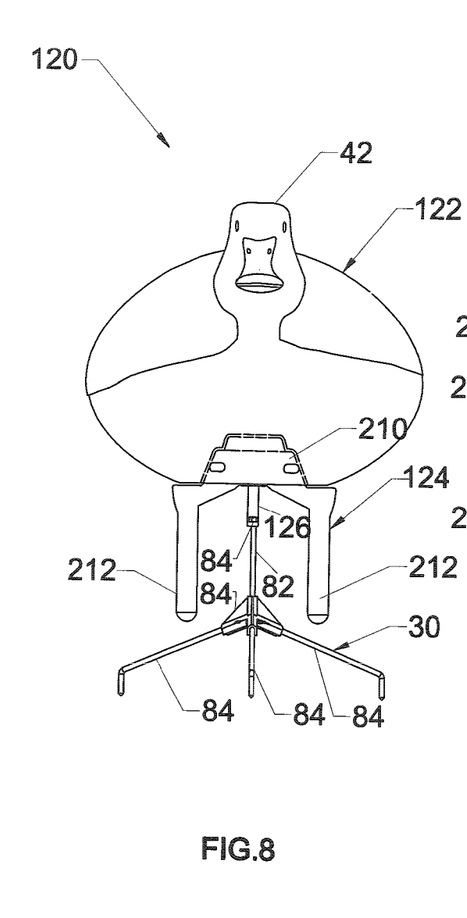
FIG. 8 is a front elevational view of another embodiment of the decoy of FIG. 1 according to an example embodiment.

Legs 212 comprise structures representing or simulating legs of decoy 120. Legs 212 extend from hub 210 downward towards stand 30. In the example illustrates how legs 212 are integrally formed as a single unitary body with hub 210. In one embodiment, hub 210 and legs 212 are molded for one or polymeric materials. In contrast to legs 24, legs, 212 provide a more three dimensional appearance, better simulating legs of the animal or object represented by decoy 120. Although legs 212 are illustrated as being integrally formed as part of hub 210, in other embodiments, legs 212 may be independent structures joined to hub 210 by welding, fasting, bonding other connection methods.

Interconnect 126 releasably joins leg mount 124 to stand 30. Interconnect 126 is substantially identical to interconnect 26 in all respects except that interconnect 126 includes at least one opening 220 in place of opening 79. Those remaining elements of interconnect 126 which correspond to interconnect 26 are numbered similarly. In the example illustrated, opening 220 comprises a pair of apertures opposite to one another on opposite sides of interconnect 126. Opening 220 comprises an elongate slit circumferentially extending about interconnect 126 so as to facilitate rotation of pin 127 within opening 220. In the example illustrated, each of the opposite apertures of opening 220 extends 120 degrees about the axis of rod 82. In other embodiments, opening 220 may have other angular extents.

Pin 127 comprises an elongate pin or bar removably received within opening 93 of rod 82 and projecting through and across one or both of the opposite apertures of opening 220. Pin 127 cooperates with opening 220 to limit the extent to which body 122 may rotate about the axis of rod 82. At the same time, pin 127 may be withdrawn from opening 93, facilitating withdrawal of rod 82 from interconnect 126 such that decoy 120 may be collapsed to the arrangement shown in FIG. 13. In such an arrangement, rod 82 is inserted through and across the opposite apertures of opening 220. In other embodiments, opening 220 and pin 127 may be omitted where other structures are provided for limiting rotation a body 122 about axis of rod 82 or where such rotation is not a concern.

Figures 11, 12:
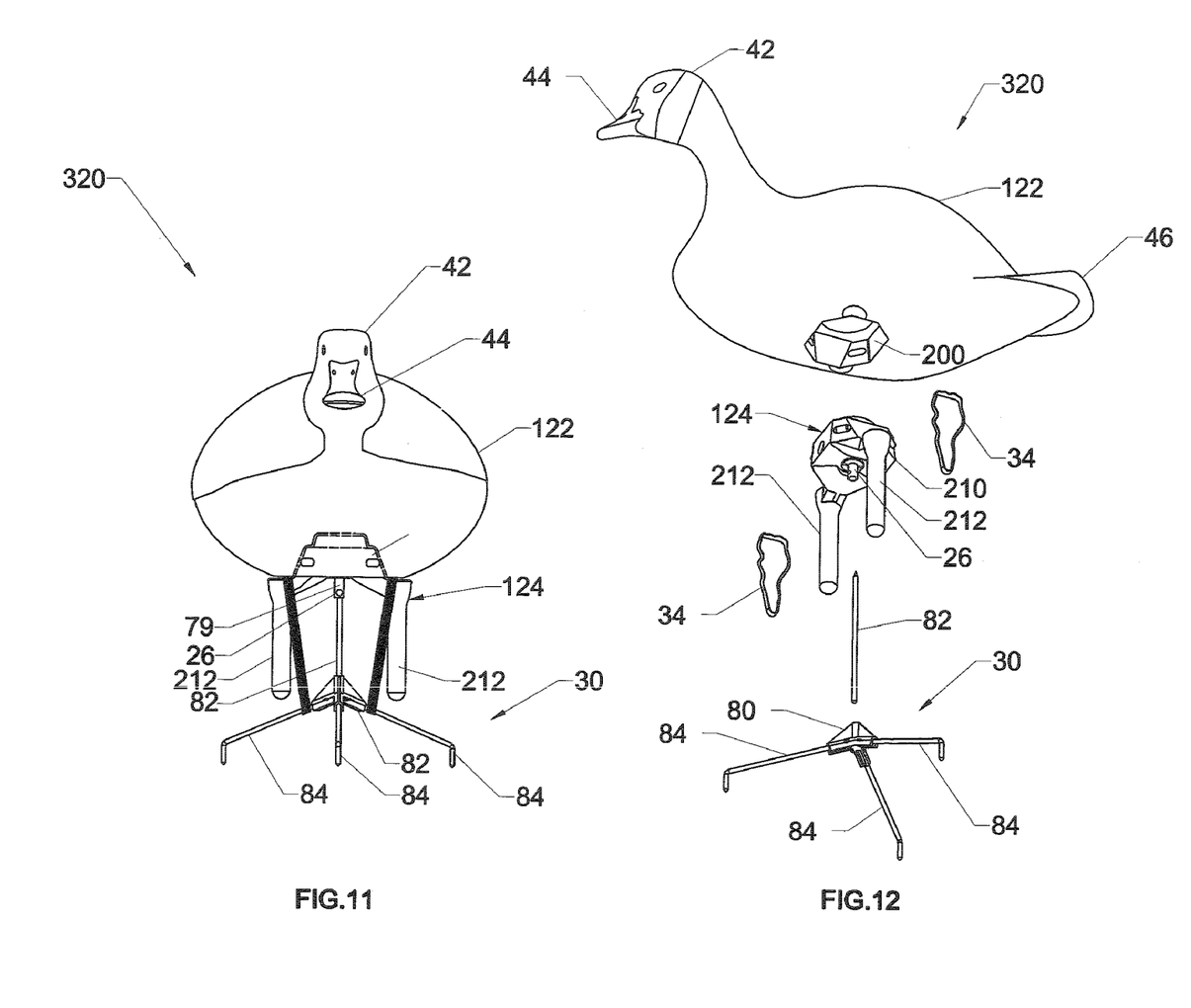
FIG. 11 is a front elevational view of another embodiment of the decoy of FIG. 1 according to an example embodiment.
FIG. 12 is a bottom exploded perspective view of the decoy of FIG. 11 according to an example embodiment.

FIGS. 11 and 12 illustrate decoy 320, another embodiment of decoy 20. Decoy 320 is similar to decoy 220 except that decoy 320 includes interconnect 26 in place of interconnect 126 and pin 127. Decoy 320 additionally includes bias members 34. Interconnect 26 and bias members 34 are described above with respect to decoy 20. As shown by FIG. 11, bias members 34 extend over and across an upper and of a leg mount 124 and beneath and around two of legs 84 of the stand 30. Bias members 34 assists in retaining interconnect 26 on top of rod 82. Bias members 34 further permit some rotation of body 122 about the axis of rod 82 while inhibiting spinning of body 122 x by 360 degrees or more about the axis of rod 82. At the same time, bias members 34 are configured to be easily removed from leg mount 124 and from stand 30 to permit legs 84 to be pivoted to their collapsed positions, to permit rod 82, to be withdrawn from interconnect 26 and to be inserted through opening 79 for storage of decoy 320 as shown in FIG. 14. As further shown by FIG. 14, bias members 34 may additionally be used to secure and retain legs 84 in their collapsed positions adjacent to and along body 122 for compact storage.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A decoy comprising:
  a decoy body; and
  a stand supporting the body, the stand comprising:
    a rod extending along an axis about which the body is configured to rotate;
    at least three legs pivotably coupled to the rod for pivoting between an extended position and a collapsed position; and
    a retainer structure coupled between the rod and in the legs, the structure releasably pivotably retaining each of the legs in the extended position, wherein the retainer structure includes a channel for each leg, each channel comprising:
      a pair of walls which form a leg receiving portion and a mouth, said mouth communicates with said leg receiving portion receiving a portion of one of the at least three corresponding legs, said walls configured to resiliently flex from a first state in which the mouth has a first width less than a width of the portion of one of the at least three corresponding legs to be received through the mouth and a second state in which the mouth has a second width greater than the width of the portion of one the at least three corresponding legs to be received through the mouth.

2. The decoy of claim 1, wherein the channels are integrally formed as part of a single unitary body of one or more polymeric materials.

3. The decoy of claim 1, wherein the retainer structure includes a bore receiving the rod along the axis and wherein each of the legs extends oblique to the axis in the extended position.

4. The decoy of claim 1, wherein the body includes an opening bounded by a wall, the decoy further comprising an interconnect coupled between the body and the rod of the stand, the interconnect comprising:
  a cavity receiving the rod; and
  an annular groove receiving the wall of the body.

5. The decoy of claim 4, wherein the interconnect includes a pair opposite circumferential openings configured to receive the rod such that the rod extends across the cavity and through the interconnect.

6. The decoy of claim 5, wherein the interconnect is configured to resiliently flex during insertion of the wall into the groove.

7. The decoy of claim 6, wherein the interconnect includes a slit facilitating flexing of the interconnect.

8. The decoy of claim 5, wherein the interconnect includes an opening and wherein the rod further comprises a projection radially extending into the opening, wherein the opening is sized to permit rotation of the interconnect about the axis and to limit rotation of the interconnect relative to the rod to less than 360 degrees about the axis.

9. The decoy of claim 5, wherein the opening includes a keyway and wherein the interconnect comprises a key in the keyway to limit rotation of the interconnect relative to the decoy body.

10. The decoy of claim 1 further comprising at least one elastic member having a first portion coupled to the decoy body and a second portion coupled to one of the stand legs.

11. The decoy of claim 10 further comprising flexible bands coupled between each elastic member and the decoy body.

12. The decoy of claim 1 further comprising an interconnect coupled between the body and the rod of the stand, the interconnect including a cavity receiving the rod, wherein the interconnect includes an opening and wherein the rod further comprises a projection radially extending into the opening, wherein the opening is sized to permit rotation of the interconnect about the axis and to limit rotation of the interconnect relative to the rod to less than 360 degrees about the axis.

13. The decoy of claim 1 further comprising means for limiting rotation of the body about the axis of the rod.

14. The decoy of claim 1, wherein each of the channels is three sided with the mouth facing in a downward direction away from the body.

15. The decoy of claim 1 wherein the body includes:
  a main portion having an opening bounded by a wall; and a leg mount portion received within the opening and including legs extending away from the main portion.

16. The decoy of claim 15 further including an interconnect connected to the leg mount portion and receiving the rod.

17. The decoy of claim 15, wherein the leg mount portion includes an opening bounded by a wall, the decoy further comprising an interconnect coupled between the leg mount portion and the rod of the stand, the interconnect comprising:
a cavity receiving the rod; and
an annular groove receiving the wall of the leg mount portion.

18. The decoy of claim 17, wherein the interconnect is configured to resiliently flex during insertion of the wall into the groove.

19. The decoy of claim 18, wherein the interconnect includes a slit facilitating flexing of the interconnect.

20. The decoy of claim 17, wherein the interconnect includes an opening and wherein the rod further comprises a projection radially extending into the opening, wherein the opening is sized to permit rotation of the interconnect about the axis and to limit rotation of the interconnect relative to the rod to less than 360 degrees about the axis.

21. A decoy comprising:
a decoy body; and
a stand supporting the body, the stand comprising:
a rod extending along an axis about which the body is configured to rotate;
at least three legs pivotably coupled to the rod for pivoting between an extended position and a collapsed position; and
a retainer structure coupled between the rod and in the legs, the structure releasably retaining configured to releasably retain each of the legs in the extended position, wherein the retainer structure includes a channel for each leg, each channel receiving a portion of one of the at least three legs, each channel having a resilient mouth having a dimension less than a corresponding dimension of the portion that is received by the channel; and
an interconnect coupled between the body and the rod of the stand, the interconnect including a cavity receiving the rod, wherein the interconnect includes an opening and wherein the rod further comprises a projection radially extending into the opening, wherein the opening is sized to permit rotation of the interconnect about the axis and to limit rotation of the interconnect relative to the rod to less than 360 degrees about the axis.

* * * * *